Sept. 30, 1969   M. A. VERTES ET AL   3,470,071
METHOD AND APPARATUS FOR DETECTING GAS
Filed July 11, 1966

INVENTORS,
MICHAEL A. VERTES
HARRY G. OSWIN

United States Patent Office 3,470,071
Patented Sept. 30, 1969

3,470,071
METHOD AND APPARATUS FOR DETECTING GAS
Michael A. Vertes, New York, and Harry G. Oswin, Chauncey, N.Y., assignors to Leesona Corporation, Warwick, R.I., a corporation of Massachusetts
Filed July 11, 1966, Ser. No. 564,262
Int. Cl. B01k 3/00; B01d 13/02
U.S. Cl. 204—1      15 Claims

ABSTRACT OF THE DISCLOSURE

A detector for sensing the presence of noxious gases in the atmosphere is described comprising an anode, a cathode, an electrolyte, and an external circuit including a warning signal connecting the anode and cathode. The anode and cathode each comprise a liquid impermeable and gas permeable polymer membrane coated at one surface with a catalytic layer. The catalytic layer of the cathode is electrochemically active with respect to the oxygen of its environment and invariant to the gas being detected, whereas the catalytic layer of the anode includes in its catalytic layer a material reactive with the gas to be detected. The detector is constructed and arranged in order that the catalytic layer of the anode and cathode is in contact with the electrolyte of the detector and the hydrophobic polymer of each of the anode and cathode is in contact with the atmosphere. The detector is sensitive, of simplified construction, and compact, making it capable of use as a personal detector.

---

Figure 1:
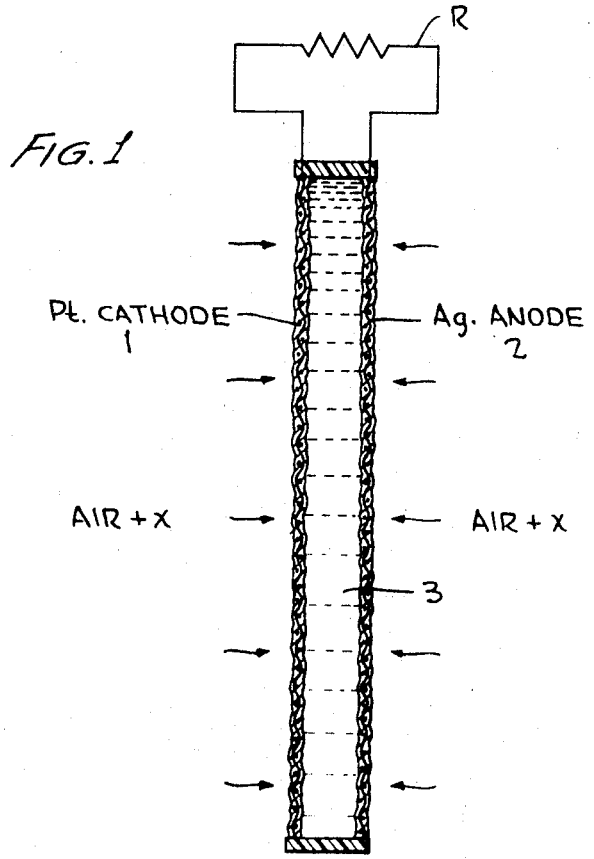

This invention relates to gas detectors. More particularly, the invention relates to detectors for gases such as hydrogen cyanide, hydrogen sulfide and hydrogen fluoride, and chemical compositions which readily undergo chemical reaction to yield detectable compounds, and to alarm systems employing the detector. The detector is extremely compact, essentially comprising thin, porous, gas diffusion membrane electrodes associated with a catalytic material, separated by an electrolyte. The electrodes are connected by a suitable external circuit. The gases to be detected in the air or atmosphere diffuse through the gas diffusion membrane electrodes and are detected as a result of a spontaneous electrolytic reaction.

The detection of noxious gases in the atmosphere is, and has been, a continuous problem to industry. Hydrogen cyanide which only possesses a faint odor is particularly dangerous. In recent years, in view of the increased use of derivatives of hydrogen cyanide such as polyacrylonitrile, the detection of the gas in manufacturing and storage areas has become more critical. Similarly, the increased use of fluorocarbons and other materials where hydrogen fluoride is employed in manufacturing processes has created or increased industrial hazards.

In addition to civilian problems, in military operations where hydrogen cyanide is used in the preparation of poisonous gases, its detection again causes concern. A still further area of concern by the military is in the detection of the highly toxic organophosphorous compounds which have been developed as nerve gases for chemical warfare. The latter group of compounds as reported by A. L. Green and B. Saville, Journal of the Chemical Society (1956) 3887; and B. Saville, Anaylst, 82, 269 (1957), readily react in the presence of certain materials such as the oximes to produce hydrogen cyanide. Therefore, the ability to detect hydrogen cyanide, also permits the detection of the poisonous organophosphorous compounds.

In the prior art, the use of internal or spontaneous electrolysis has been suggested for the detection of noxious gases including hydrogen cyanide. However, all of the systems described are complex and require a great deal of ancillary equipment for circulating electrolyte, scrubbing and circulating air, and the like. Particularly in view of the need for circulating the electrolyte in order to obtain rapid detection of the gases, such systems cannot be conveniently manufactured, or made up as small units to permit their use as personal detectors for military personnel and/or for personal use by plant foremen and the like in manufacturing and storage areas. It has now been found that a spontaneous electrolysis alarm unit can be prepared which is small in size, light in weight, simple to operate and maintain, requires minimum logistic support, is low in cost and is extremely sensitive, reliable and mechanically rugged.

Accordingly it is an object of the present invention to provide a gas detector which is highly efficient and can be conveniently manufactured in compact form.

It is another object of the present invention to provide a gas detector which operates by spontaneous electrolysis which does not need a flowing electrolyte.

It is another object of this invention to provide a gas detector which operates by spontaneous electrolysis which has a high electrode-electrolyte-gas contact area.

It is another object of this invention to provide a detector for hydrogen cyanide gas and for noxious materials such as the organophosphorous compounds whch readily react to produce hydrogen cyanide.

These and other objects of the present invention will be more fully apparent from the following detailed description with particular reference to the embodiment shown in the drawing.

The aforesaid objects are accomplished by fabricating an electrochemical cell comprising thin, gas permeable, liquid impermeable membrane electrodes positioned on either side of an electrolyte. The external or outside surfaces of the membranes are in contact with air or the environment from which a gas is to be detected. The internal or inside surface of the membrane is in contact with the electrolyte and contains a uniform layer of catalyst and/or reactant. The electrodes are connected by means of an external electrical circuit. One of the membrane electrodes, hereinafter referred to as the cathode, remains invariant and unaffected by the agent in the air which is to be detected. The second membrane electrode, hereinafter referred to as the anode, is corroded by the agent to be detected, when in contact with electrolyte, causing spontaneous electrolysis, i.e., a reaction which proceeds without any external applied potential.

In operation of the system, four consecutive processes occur: (1) transfer of the agent to be detected from the air or given environment to the electrolyte; (2) reaction between the gas to be detected and the electrolyte to form dissolved ions; (3) diffusion of the dissolved ions to the detecting anode; and (4) anodic depolarization of the detecting anode which is sensed as a voltage or current change through the cell. As is apparent, to achieve the required response time and sensitivity, all of the aforesaid processes must be rapid. The electrolytic cell herein described is capable of accomplishing the aforesaid processes rapidly primarily in view of the large available surface area of the detecting electrode permitting access of the gas to the electrolyte-electrode interface. The electrode surface has a multiplicity of porous openings where the electrolyte, electrode, and gas will meet and reaction occur.

Figure 2:
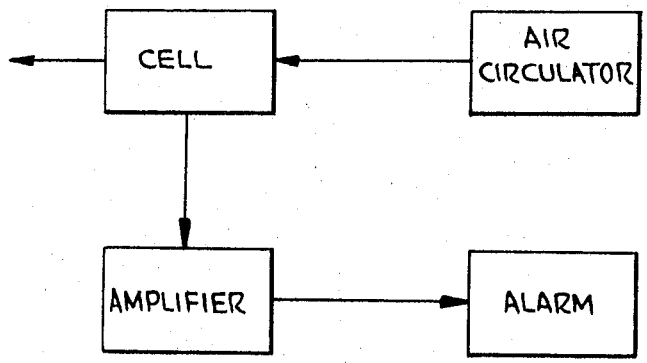

To more particularly illustrate the invention, reference is made to the drawing wherein FIGURE 1 is a cross-sectional view of the electrochemical cell, and FIGURE 2 is a block diagram of a complete spontaneous electrolysis alarm system. The cell illustrated is specifically designed for the detection of hydrogen cyanide. However, as will be more apparent hereinafter, modifications can be made for detecting other gases. In the cell, cathode 1 comprises a hydrophobic membrane, such as polytetrafluoroethylene, having a coating of platinum black and polytetrafluoroethylene (PTFE) particles in admixture uniformly applied thereto. A 52 mesh nickel screen is pressed into the catalytic layer to increase the conductivity of the electrode. Anode 2 comprises a hydrophobic membrane such as polytetrafluoroethylene having a coating of silver particles and PTFE particles in intimate admixture uniformly applied thereto. A 52 mesh silver screen is pressed into the catalytic or reactant layer. The catalytic layers are in contact with electrolyte 3, which in the embodiment shown, comprises a 0.1 molar aqueous potassium hydroxide solution. External circuit R is a high impedance circuit.

In operation, the cell is exposed to the atmosphere which possibly contains the hydrogen cyanide. In the absence of hydrogen cyanide in the atmosphere, no reaction occurs at either electrode. However, in contaminated air, the hydrogen cyanide carried by the air will diffuse through the membrane at both the anode and cathode. The cathode remains invariant to the cyanide ions formed in the electrolyte. At a three-phase interface of anode, hydrogen cyanide and electrolyte, a reaction will occur releasing cyanide ions which react with the silver of the anode. Corrosion of the anode will cause a spontaneous electrolysis reaction to occur, passing electrons from the anode to the cathode where the circuit is completed by the electrochemical reduction of oxygen to form hydroxyl ions. The signal produced by the electrochemical cell will pass to a conventional electronic amplifier as shown in the block diagram of FIGURE 2. The signal is magnified and sounds an alarm which may be a flashing light, bell, or the like. Although normally not necessary or desirable, in certain environments it may be essential to employ an air circulating device such as a fan operated on a battery to force the air to the electrolytic cell. The cell will detect hydrogen cyanide at a concentration of less than about one part per million.

The electrochemical detecting cell shown is approximately three inches by four inches by ⅜ of an inch. The entire assembly comprising the air circulator (small fan), electrochemical cell, amplifier, and alarm will make up a package of less than about six cubic inches, weighing approximately one-half pound. Furthermore, the individual components can be separately packaged and distributed since the components are separately constructed and connected together with wires, again permitting convenient packaging. As apparent, therefore, the unit can be easily carried by a plant foreman, guard, or the like, in an industrial plant where poisonous gases may be present, or by military personnel in field operations where chemical warfare is a probability.

Although the device is described with reference to hydrogen cyanide, it is possible to detect other gases carried in the air by replacing the detecting anode and possibly the electrolyte with materials which are reactive with other gases. For example, hydrogen fluoride can be detected by using the aforesaid detecting system employing acetic or benzoic acid as the electrolyte in the electrochemical cell in conjunction with an aluminum detecting anode. Furthermore, as further noted hereinbefore, the highly poisonous organophosphorous compounds such as isopropyl methylphosphorofluoridate, commonly referred to as Sarin, and diisopropyl phosphorofluoridate (commonly referred to by the initials DFP) can be detected by using anodes which are reactive with cyanide ions, i.e., silver and gold, in conjunction with an oxime electrolyte which readily converts the organophosphorous compounds into hydrogen cyanide and by-products. Thus, as described in the article by Green and Saville, supra, 1:2-dione monoximes, having the structural formula $R \cdot CO \cdot CR' : N \cdot OH$, where R equals alkyl or aryl, and R′ equals hydrogen or alkyl, will readily react with Sarin and DFP to provide a carboxylic acid, hydrogen cyanide, or an alkyl cyanide and possibly other by-products. The reaction is extremely rapid.

In the presently described detecting device, the organophosphorous compounds which are in the air, such as Sarin, contact the oxime electrolyte by diffusing through the hydrophobic membrane of the electrochemical cell. An interface of oxime electrolyte (in the presence of an alkali such as KOH), silver anode and Sarin is formed. The Sarin is converted to hydrogen cyanide and other components at the electrolyte-silver anode interface. The cyanide ions from the hydrogen cyanide react with the silver of the electrode which causes a current to flow through the impedance circuit to the platinum cathode where the electrochemical reaction is completed by reduction of oxygen to hydroxyl ions. The signal generated is passed through the amplifier where, as before, it is magnified and, in turn, triggers an alarm. As is apparent from the published literature, other materials can function as the electrolyte and will react similarly with different chemical warfare agents to produce like results.

The diffusion electrodes which are employed in the presently described gas detector comprise a gas permeable, liquid impermeable surface which has a catalytic layer in intimate contact with one surface. In operation, the catalytic material is in contact with the electrolyte of the cell and the gas permeable surface, which is preferably a hydrophobic polymer, is in contact with air or the environment which contains the gas to be detected. The polymeric materials employed normally have a porosity of from about 15 to 85 percent and a uniform pore size distribution of from about 0.01 to about 100 microns. Exemplary polymers are the fluorinated hydrocarbons such as polytetrafluoroethylene, polytrifluoroethylene, polyvinylidenefluoride, polyvinylfluoride, polytrifluorochloroethylene, polystyrene, and hydrophobic co-polymers of two or more of the above materials or with acrylonitrile, methacrylate, polyethylene, and the like. The essential requirement is that the polymer be sufficiently hydrophobic to preclude the passage of an aqueous medium but still be sufficiently permeable to permit gases to be transported to the electrolyte, anode interface. In view of the many desirable characteristics such as its hydrophobicity, and its high resistance to corrosion, polytetrafluoroethylene is the preferred polymer.

The catalyst which is to be used in the anode of the cell must be a material which is readily reactive with the gas to be detected or a by-product of the reaction of the gas with the electrolyte. Thus, in the detection of hydrogen cyanide or the detection of a gas where hydrogen cyanide is produced, gold or silver are the preferred catalysts. In the event hydrogen fluoride is to be selected, aluminum is a desirable catalytic material. Other catalysts can preferably be employed to detect different gases. The catalytic metal which is to be applied to the cathode of the electrochemical cell must be invariant to the material to be detected and reactive with oxygen. Such metals include platinum, palladium, ruthenium, osmium, and mixtures thereof.

The catalytic layer can be applied to the hydrophobic polymer by any of various techniques known in the art such as electrolysis, vapor deposition, spray deposition, rolling of an aqueous paste of the catalyst upon the membrane, peripheral diffusion of the metal to the polymer, and the like. In view of its high surface area, it is preferred that the catalytic material be applied as a black. Furthermore, it may be advantageous in order to obtain greater hydrophobicity and better control of the electrolyte meniscus in the polymer membrane to have particles of a hydrophobic material intermixed or dispersed in the black. An example of a suitable material is finely divided polytetrafluoroethylene. In the event a polymer is to be used in admixture with the catalyst, the preparation can be made up as an aqueous paste of the catalyst and hydrophobic polymer particles. For example, a thirty weight percent aqueous Teflon dispersion can be admixed with the selected metal black and applied directly to the polymer, or the admixture pressed into a metal support screen which functions to increase the mechanical integrity of the structure and its electroconductivity. Heat treatment at a temperature sufficient to dry the structure and bond the polymer particles to the metal support and to each other is desirable. Moreover, it can be desirable to first coat the polymeric membrane with a relatively electrochemically inert substance such as a zeolite or ceramic material and apply the catalyst to the inert surface. In this manner, lesser amounts of the catalyst can be employed.

The thickness of the polymer membrane and/or the catalytic layer thereon is not critical. It is only essential that the polymer membrane be sufficiently thick to withstand the pressure and ancillary conditions of its ultimate environment. The thickness of the catalytic layer can be relatively thick but preferably is as thin as possible primarily from the standpoint of economy. The ability to construct the diffusion electrodes as an exceptionally thin unit contributes to the lightness and compactness of the final cell. Preferably, the hydrophobic polymer membrane will have a thickness of from about 0.5 to 25 mils with the optimum range being from 2 to 8 mils. The catalytic layer is kept as thin as possible for purposes of economy and is preferably from about 0.2 to 8 mils in thickness, with the optimum range being from 0.5 to 2 mils.

As apparent from the statements hereinbefore, the electrolyte of the cell will depend substantially upon the gas to be detected. Thus, in the event hydrogen cyanide is to be detected, an aqueous solution of an alkali metal such as potassium hydroxide, sodium hydroxide, lithium hydroxide, rubidium hydroxide, or mixtures thereof can be selected. When it is necessary that the compound be broken down to hydrogen cyanide, such as the organophosphorous compounds, the electrolyte must be one which is capable of accomplishing the aforesaid task. Materials which are eminently suitable are the oximes such as reported in the article of Green and Saville, supra. In the event some other gas is to be detected such as hydrogen fluoride, an acid electrolyte such as acetic or benzoic acid is preferred. One skilled in the art will be able to determine the proper electrolyte to be employed, depending upon the gas to be detected, for use in the presently described electrolytic cell.

Furthermore, although the cell illustrated utilizes a high impedance resistor for completing the electrical circuit, other means can be selected. For example, a short circuit current change, or a potential change can be measured.

It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. A detector for detecting gases in the atmosphere comprising a housing, an anode, a cathode, an ion-conductive electrolyte between said anode and cathode, and an external circuit including a warning signal connecting said anode and cathode; said anode and cathode each comprising a liquid-impermeable and gas-permeable hydrophobic polymer membrane coated on only one surface with a metal containing catalytic layer; said detector being constructed and arranged in order that the exposed surface of said membrane of each of said anode and cathode forms at least a substantial part of the outer portion of said housing of said detector in order that said portion of both said anode and cathode is exposed directly and only to the atmosphere of its environment and the catalytic layer on said hydrophobic polymer of each of said anode and cathode is in contact with the electrolyte of the detector to permit gases in said atmosphere to pass through said membrane of both anode and cathode to said electrolyte separating said anode and cathode; said cathode being electrochemically reactive with respect to the oxygen of its environment but being invariant to the gas to be detected and said anode including in its catalytic layer a material chemically reactive with the gas to be detected when in the presence of an ion-conductive electrolyte, thereby causing when the gas to be detected is present in the atmosphere (a) the transfer of said gas to be detected through said hydrophobic membrane of both said anode and cathode into the electrolyte for reaction with said electrolyte to form dissolved ions; (b) the diffusion of said ions to said detecting anode; and (c) chemical reaction of said anode material and said ions to provide a current flow across said external circuit to actuate said warning signal.

2. The detector of claim 1 wherein the gas to be detected is hydrogen cyanide.

3. The detector of claim 2 wherein the polymer membrane is polytetrafluoroethylene and the catalytic layer of said anode and cathode comprise an admixture of metal particles and hydrophobic polymer particles.

4. The detector of claim 3 wherein the polymer particles are polytetrafluoroethylene.

5. The detector of claim 4 wherein the anode material reactive with hydrogen cyanide is silver, and the electrolyte is an aqueous solution of potassium hydroxide.

6. The detector of claim 4 wherein the anode material reactive with hydrogen cyanide is gold, and the electrolyte is an aqueous solution of potassium hydroxide.

7. The detector of claim 2 wherein the polymer membrane of each of said anode and cathode is polytetrafluoroethylene and the catalytic layer of the anode comprises a uniform admixture of hydrophobic polymer particles and particles of silver, or gold, or mixtures thereof, and the catalytic layer of the cathode comprises a uniform admixture of hydrophobic polymer particles and platinum black.

8. The detector of claim 7 wherein the polymer particles are polytetrafluoroethylene.

9. The detector of claim 8 wherein the electrolyte comprises an oxime reactive with an organophosphorous compound to yield hydrogen cyanide.

10. The detector of claim 2 wherein said external circuit includes an amplifier constructed and arranged therein to amplify said warning signal.

11. The method of detecting hydrogen cyanide gas, or a gas reactive with an ion-conducted medium to generate hydrogen cyanide, present in the atmosphere comprising the steps of (1) simultaneously exposing said atmosphere to an anode and a cathode, said anode and cathode each comprising a liquid impermeable and gas permeable polymer membrane coated at one surface with a catalytic layer, the catalytic layer of said cathode being electrochemically active with respect to the oxygen of the atmosphere and invariant to the hydrogen cyanide gas being detected and said anode including in its catalytic layer a material reactive with the hydrogen cyanide gas in the atmosphere to be detected; (2) maintaining the catalytic layer of each of said anode and cathode in contact with an ion-conductive electrolyte medium during said exposure; (3) maintaining said electrodes during said exposure in electronic connection through an external circuit to pass said electrons generated by said hydrogen cyanide gas reacting with said anode material to said cathode for consumption; and (4) sensing said electrons flowing across said external circuit, thereby detecting said hydrogen cyanide gas.

12. The method of claim 11 wherein the gas to be detected is an organophosphorous compound and the electrolyte comprises a material reactive with said organophosphorous compound to yield hydrogen cyanide.

13. The method of claim 12 wherein the electrolyte comprises an oxime.

14. The method of claim 11 wherein the polymer membrane of each of said anode and cathode is polytetrafluoroethylene and the catalytic layer of the anode comprises a uniform admixture of hydrophobic polymer particles and particles of silver, or gold, or mixtures thereof; and the catalytic layer of the cathode comprises a uniform admixture of hydrophobic polymer particles and platinum black.

15. The method of claim 14 wherein the polymer particles are polytetrafluoroethylene.

References Cited

UNITED STATES PATENTS

| | | | |
|---|---|---|---|
| 2,517,382 | 8/1950 | Brinker et al. | 204—195 |
| 3,149,921 | 9/1964 | Warner. | |
| 3,239,444 | 3/1966 | Heldenbrand | 204—195 |
| 3,297,484 | 1/1967 | Niedrach. | |
| 3,328,204 | 6/1967 | Grubb | 136—86 |

JOHN H. MACK, Primary Examiner

T. TUNG, Assistant Examiner

U.S. Cl. X.R.

204—195